United States Patent [19]

Aucktor

[11] 4,427,085
[45] Jan. 24, 1984

[54] WHEEL SUPPORT ASSEMBLY FOR A MOTOR VEHICLE

[75] Inventor: Erich Aucktor, Offenbach am Main, Fed. Rep. of Germany

[73] Assignee: Löhr & Bromkamp GmbH, Offenbach, Fed. Rep. of Germany

[21] Appl. No.: 238,625

[22] Filed: Feb. 26, 1981

[30] Foreign Application Priority Data

Mar. 11, 1980 [DE] Fed. Rep. of Germany ....... 3009199

[51] Int. Cl.$^3$ .............................................. B60K 17/30
[52] U.S. Cl. .............................. 180/70 R; 308/189 R; 308/191; 308/236; 464/178
[58] Field of Search ................ 180/70 R, 73 C, 73 D, 180/73 R, 74, 75; 308/189 R, 191, 236, 173, DIG. 2; 301/6 E; 464/139, 906, 178

[56] References Cited

U.S. PATENT DOCUMENTS

| | | | |
|---|---|---|---|
| 3,757,883 | 9/1973 | Asberg .............................. | 180/70 R |
| 3,944,011 | 3/1976 | Ernst et al. ...................... | 180/70 R |
| 4,010,986 | 3/1977 | Otto ............................ | 308/189 R X |
| 4,150,553 | 4/1979 | Aucktor ........................ | 180/70 R X |

FOREIGN PATENT DOCUMENTS

| | | | |
|---|---|---|---|
| 1298552 | 12/1972 | United Kingdom ................ | 308/191 |
| 1358842 | 7/1974 | United Kingdom ................ | 308/191 |

Primary Examiner—David M. Mitchell
Assistant Examiner—Mitchell J. Hill
Attorney, Agent, or Firm—Toren, McGeady and Stanger

[57] ABSTRACT

A wheel hub assembly for a motor vehicle wheel having: a bearing including an outer bearing ring adapted to be affixed with the vehicle chassis and an inner bearing ring having the vehicle wheel mounted thereon; a rotary joint including an inner joint member and an outer joint member rotatively fixed with the inner bearing ring; and a stepped bore provided in the inner bearing ring opening toward the rotary joint and receiving the outer joint member therein. The outer joint member has on its side facing the bearing a centering surface engaging within the stepped bore to provide a centering effect between the outer joint member and the inner bearing ring. The centering surface simultaneously serves as a welding face for a welded joint formed by a low heat welding process between the inner bearing ring and the outer joint member. The outer joint member is also formed with a surface cooperating with the stepped bore of the inner bearing ring and spaced a distance from the inner bearing ring.

4 Claims, 3 Drawing Figures

WHEEL SUPPORT ASSEMBLY FOR A MOTOR VEHICLE

The present invention relates generally to a wheel assembly for a motor vehicle and more particularly to an assembly wherein a vehicle wheel is mounted with a bearing assembly for the hub of the wheel, with the wheel hub being driven by a rotary CV joint provided at the respective wheel carrier of the motor vehicle.

More specifically, the invention relates to an assembly of the type wherein the outer bearing ring of the bearing assembly is designed so as to be affixed with the vehicle chassis and wherein the wheel hub and the inner bearing ring of the bearing assembly are nonrotatively connected with the outer joint body of the rotary CV joint.

In an assembly of this type, known in the prior art from U.S. Pat. No. 3,944,011, provision is made for a wheel bearing where the joint at the actual beam assembly can be replaced. Additional space must be provided for splines to ensure the transmission of torque and there is an additional disadvantage in that the elastic deformation of the outer part of the joint may affect the bearing.

Another bearing assembly of the prior art, known from U.S. Pat. No. 3,757,883, involves a bearing in the case of which the outer joint body is pressed into a bore of the inner bearing ring. In the case of such an arrangement, there is also the risk of elastic deformation of the joint affecting the bearings at maximum angles of articulation and maximum torque. Additionally, the inner bearing ring heats up as a result of the braking heat and in view of the direct connection to the outer part of the joint, such heat is transferred to the driving joint.

It is therefore a purpose of the invention to provide a wheel bearing assembly consisting of two separate completely assembled individual components which are undetachably connected to each other and to ensure that the negative characteristics, such as development of heat and elastic deformation, of one component are not transferred to the other component.

SUMMARY OF THE INVENTION

Briefly, the present invention may be defined as a wheel hub assembly for a motor vehicle wheel comprising bearing means including an outer bearing ring adapted to be affixed with the vehicle chassis and an inner bearing ring having the vehicle wheel mounted thereon; rotary joint means including an inner joint member and an outer joint member rotatively fixed with the inner bearing ring; and a stepped bore provided in the inner bearing ring opening toward the rotary joint means and receiving the outer joint member therein; the outer joint member having on its side facing the bearing means a centering surface engaging within the stepped bore to provide a centering effect between the outer joint member and the inner bearing ring, the centering surface simultaneously serving as a welding face for a welded joint formed by a low heat welding process between the inner bearing ring and the outer joint member, and a surface cooperating with the stepped bore of the inner bearing ring and being spaced a distance from the inner bearing ring.

Thus, the objectives of the invention are achieved in that:

1. on its opening facing the joint, the inner bearing ring is provided with a stepped bore;

2. on its side facing the bearing, the outer joint body of the joint is provided with a surface cooperating with the bore of the inner bearing ring, and with a centering surface;

3. for the joint, the centering surface of the inner bearing ring simultaneously serves as a welding surface for a low heat welding process; and 4. the face or surface of the outer joint body is arranged to be spaced a distance from the inner bearing ring.

The advantages of a design such as that of the present invention arise in that a low heat welding process may be used to assemble both units completely. By welding the two parts together, distortion or other damage becomes unlikely. Such a wheel bearing assembly is utilized to drive wheels, for example, steered driven wheels such as are used for vehicles with front drive, or nonsteered driven wheels of a rear wheel drive, for example, with independent wheel suspension. The connection of the components by means of the centering face or surface largely prevents the elastic deformations of the joint from reaching the bearing, as the remaining accommodating faces or surfaces are arranged at a distance from the inner bearing ring. Furthermore, due to the fact that the outer joint member has been arranged at a distance, the heat occurring when a vehicle is braked is not transmitted to the joint because a direct connection between the bearing and the joint exists only over an extremely small area. It does not cause problems to utilize joints of the most varied designs, such as double offset joints or joints with crossed grooves.

In order to ensure that the assemblies are undetachably connected so as to be distortion-free and with the smallest amount of heat developing, a further essential characteristic of the invention provides for a low-carbon steel to be used if an electric beam welding process is to be applied to the inner bearing ring and the outer joint member.

Furthermore, in the case of axial welding, provision should be made for an annular shoulder whose inner bore is smaller than the outer diameter of the centering face of the outer joint member so that the outer joint member may be affixed with a pressed fit.

The advantage of such a design is that the two assemblies can be fixed and assembled without necessitating that the welding operation be performed immediately. The joint is pressed into the inner bearing ring and simultaneously centered so that it is prepared for electron beam welding in an axial direction.

In cases where radial welding proves to be advantageous, a further characteristic provides for the welding faces to be annular end faces or surfaces facing each other. In such a case, the centering faces or surfaces are given a transition fit. The welding surfaces are not at the same time centering surfaces.

To protect the joint interior against external influences, provision is further made for the stepped bore to be provided with a sealing cap which is axially fixed by the joint and which seals the joint interior.

Simultaneously with assembly of the joint, the sealing cap may be provided with a packing before being inserted into the bore of the inner bearing ring and it is axially fixed as a result of the assembly of the joint. A turned step acting as a stop face for the sealing cap is advantageous in certain applications.

The various features of novelty which characterize the invention are pointed out with particularity in the claims annexed to and forming a part of this disclosure.

For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
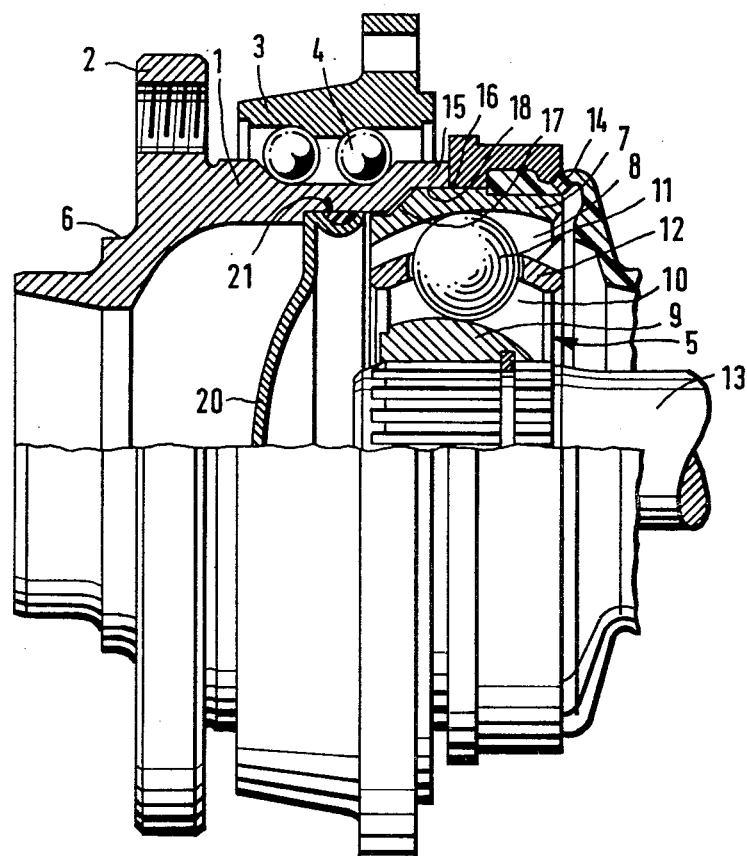
FIG. 1 is a sectional view illustrating a wheel bearing assembly with a driving joint

In accordance with the present invention, a wheel bearing assembly for a motor vehicle is illustrated in FIG. 1 which essentially consists of an inner bearing ring 1 which has been provided with a flange 2. On the inner bearing ring 1 and on an outer bearing ring 3, races for rolling bodies 4 are arranged in such a way that a double-row angular ball bearing—a so-called Radiax bearing—is produced.

The assembly also includes a joint 5, and on its side away from the joint 5, the inner bearing ring 1 has a centering seat 6 for accommodating a brake disc. The joint 5 includes an outer joint member 7 which, within an interior cavity thereof, is provided with grooves 8. An inner joint member 9 is arranged in the outer joint member 7 and it is also provided with grooves 10.

Balls 11, which are guided in windows of a cage 12, are each accommodated in a groove 8 and 10 of the outer and inner joint members 7, 9, respectively, the balls 11 operating to effect torque transmission.

The inner joint member 9 has a bore into which a profiled shaft 13 is inserted for driving engagement by means of splines or similar fixing means. The joint is sealed by a bellows 14.

The inner bearing ring 1 has an annular shoulder 15 having an inner diameter which is smaller than the outer diameter 16 of the outer joint member 7 so that the assembly procedure may be performed with a press fit.

An inner axis-parallel annular face 18 serves as the centering face or surface of the joint. The outer joint body 7 and the inner bearing ring 1, are provided respectively with a first and a second oblique annular surface embodied by juxtaposed faces 17 which are arranged spaced a distance relative to each other so that there can be no heat transfer between the two parts.

Furthermore, the joint is sealed by a cover 20 which is fixed in a recess 21 so that, while the joint is pressed in, the cover 20 is fixed at the same time. The inner bearing ring 1 and the outer joint member 7 are made of low-carbon steel and the bearing and joint members are secured together by welding between the surfaces 16, 18 by a low heat process such as electron beam welding. Welding may be accomplished by an axially directed electron beam so that the annular shoulder 15 is connected to the outer joint body 7.

Figure 2:
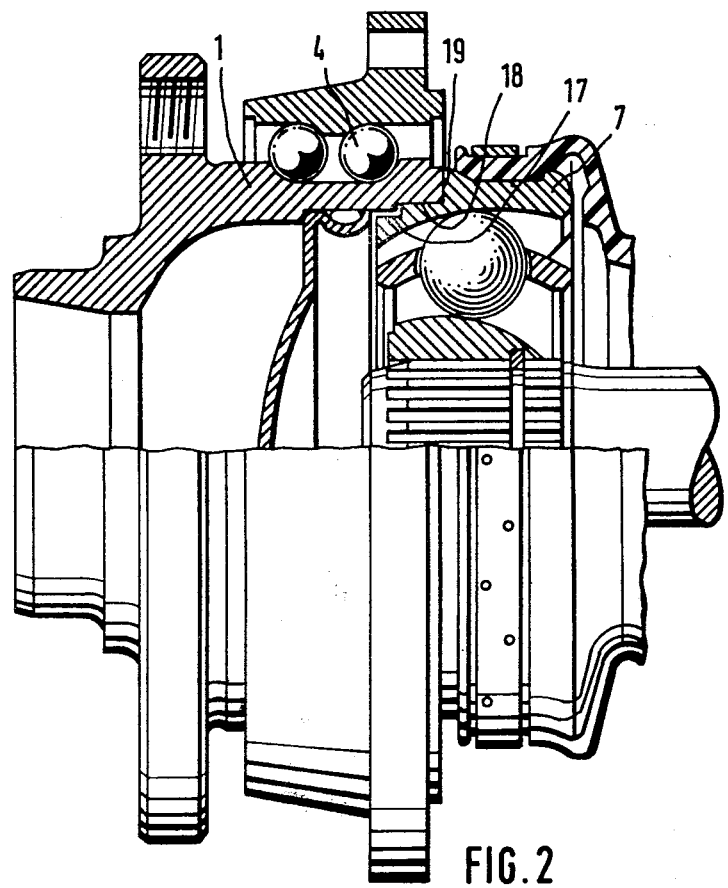
FIG. 2 is a sectional view illustrating a wheel bearing assembly with a rotary CV joint illustrated, in principle, as in FIG. 1 in a modified form.

FIG. 2 shows a modification of the wheel assembly wherein the centering face or surface 18 of the inner bearing ring 1 is fitted to the centering face 18 of the outer joint member 7 by a transition fit. Welding by an electron beam directed in the radial direction occurs at the annular end faces 19. In the case of the embodiment of FIG. 2, the faces or surfaces 17 are also spaced a distance from the inner bearing ring 1 since in this case also the bearing of the wheel bearing assembly must not be affected by heat transfer or elastic deformation of the joint.

Figure 3:
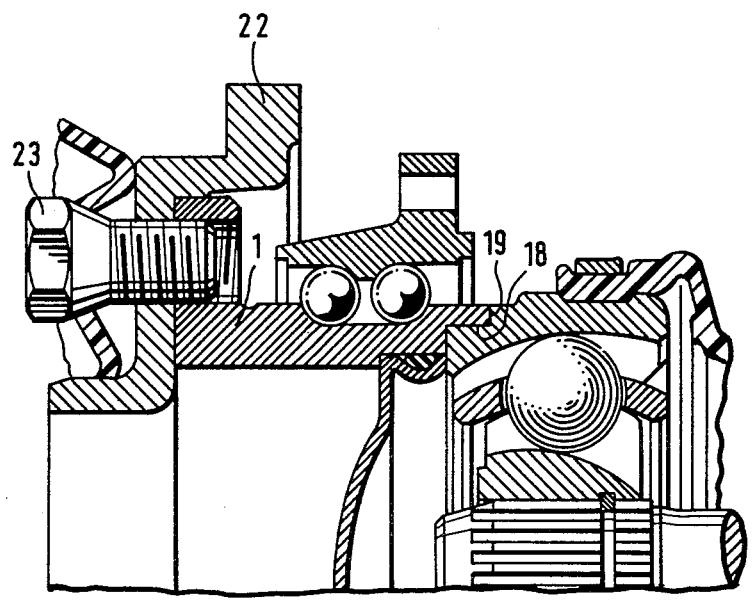
FIG. 3 is a sectional view of a further alternative of a wheel bearing assembly in a modified form.

In contrast, FIG. 3 again shows, in principle, the centering surface 18 with radial welding occurring at the annular end faces 19. However, this embodiment does not include a centering seat for the brake disc 22 which is fixed directly to the inner bearing ring 1 by means of a wheel stud 23.

While specific embodiments of the invention have been shown and described in detail to illustrate the application of the inventive principles, it will be understood that the invention may be embodied otherwise without departing from such principles.

What is claimed is:

1. A wheel hub assembly for a motor vehicle wheel comprising: bearing means including an outer bearing ring adapted to be affixed with a vehicle chassis and an inner bearing ring having said wheel mounted thereon; rotary joint means including an inner joint member and an outer joint member rotatively fixed with said inner bearing ring; first surface means including an inner axis-parallel annular face provided in said inner bearing ring opening toward said rotary joint means and receiving said outer joint member therein; second surface means provided on said outer joint member on the side facing said bearing means arranged in cooperative relationship with said first surface means to mount said outer joint member within said inner bearing ring, said second surface means including a centering surface engaging within said inner axis-parallel annular face to provide a centering effect between said outer joint member and said inner bearing ring, said centering surface simultaneously serving as a welding face for a welded joint formed by a low-heat welding process between said inner bearing ring and said outer joint member; a first oblique annular surface forming part of said first surface means extending contiguously with said inner axis-parallel annular face; and a second oblique annular surface forming part of said second surface means extending contiguously with said centering surface; said first and said second oblique annular surfaces being arranged in facing juxtaposed relationship and spaced apart from each other a distance to inhibit heat transfer between said inner bearing ring and said outer joint member.

2. An assembly according to claim 1 wherein said inner bearing ring and said outer joint member are made of low-carbon steel and welded together by an electron beam welding process.

3. An assembly according to claim 1 wherein said outer joint member and said inner bearing ring are joined together by electron beam welding utilizing an axially directed electron beam and wherein said inner axis-parallel annular face on said inner bearing ring is dimensioned relative to the outer diameter of said centering face of said outer joint member so that the outer joint member and the inner bearing ring may be affixed together with a press fit.

4. An assembly according to claim 1 wherein said inner bearing ring and said outer joint member are joined together by electron beam welding utilizing a radially directed electron beam, said welding being effected between welding faces which are annular end faces of said inner bearing ring and said outer joint member which face each other.

* * * * *